(12) United States Patent
Rømer

(10) Patent No.: US 11,449,081 B2
(45) Date of Patent: Sep. 20, 2022

(54) WATER UTILITY METER WITH SMART RECONNECT FUNCTION

(71) Applicant: Kamstrup A/S, Skanderborg (DK)

(72) Inventor: Daniel Beck Rømer, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 631 days.

(21) Appl. No.: 16/502,787

(22) Filed: Jul. 3, 2019

(65) Prior Publication Data

US 2020/0011722 A1    Jan. 9, 2020

(30) Foreign Application Priority Data

Jul. 5, 2018   (EP) .................................... 18181935

(51) Int. Cl.
| | | |
|---|---|---|
| *G05D 7/06* | (2006.01) | |
| *G01F 15/00* | (2006.01) | |
| *G01F 15/075* | (2006.01) | |
| *G01D 4/00* | (2006.01) | |
| *G01F 15/063* | (2022.01) | |

(Continued)

(52) U.S. Cl.
CPC ............ *G05D 7/0623* (2013.01); *F17D 5/06* (2013.01); *G01D 4/002* (2013.01); *G01F 15/003* (2013.01); *G01F 15/005* (2013.01); *G01F 15/007* (2013.01); *G01F 15/063* (2013.01); *G01F 15/0755* (2013.01); *G05D 7/06* (2013.01); *G06Q 50/06* (2013.01); *H04Q 2209/60* (2013.01); *Y04S 20/30* (2013.01)

(58) Field of Classification Search
CPC ..... G01D 4/002; G01F 15/005; G01F 15/007; G01F 15/0755; G01F 15/003; G01F 15/063; G05D 7/06; G05D 7/0623; G06Q 50/06; H04Q 2209/60; F17D 5/06; Y04S 20/30
See application file for complete search history.

(56) References Cited

U.S. PATENT DOCUMENTS 9,900,667 B2    2/2018  Sewell et al.
10,352,504 B2 *  7/2019  Dietzen .................. G08B 21/20
(Continued)

FOREIGN PATENT DOCUMENTS

WO   2015154135 A1   10/2015
WO   2016077509 A1    5/2016

*Primary Examiner* — Crystal J Barnes-Bullock
(74) *Attorney, Agent, or Firm* — Renner, Otto, Boisselle & Sklar, LLP

(57) ABSTRACT

A water utility meter arranged to register the volume of water delivered to a consumption site through a distribution network and connect or disconnect the consumption site from the utility distribution network is disclosed. The water utility meter comprises: a flow sensor arranged to measure a flow rate and/or a volume of water delivered to the consumption site; a valve for connecting and disconnecting the consumption site from the distribution network; an actuator for opening and closing the valve; and a controller unit arranged to control the actuator. The controller unit is configured to connect the consumption site to the distribution network by operating the actuator to open the valve. After opening the valve the controller unit analyses flow rate and/or volume measurements from the flow sensor to determine if a reference profile is violated. If the reference profile is violated the controller unit will disconnect the consumption site from the distribution network by closing the valve.

20 Claims, 4 Drawing Sheets

(51) Int. Cl.
*F17D 5/06* (2006.01)
*G06Q 50/06* (2012.01)

(56) References Cited

U.S. PATENT DOCUMENTS

| | | | |
|---|---|---|---|
| 10,642,289 B1* | 5/2020 | Reeder | G05D 23/1366 |
| 11,022,124 B2* | 6/2021 | Ward | F04F 5/00 |
| 11,187,223 B2* | 11/2021 | Ward | F04D 13/12 |
| 2002/0094799 A1* | 7/2002 | Elliott | G01D 4/002 |
| | | | 455/41.3 |
| 2010/0204839 A1 | 8/2010 | Behm et al. | |
| 2011/0114202 A1 | 5/2011 | Goseco | |
| 2015/0286222 A1 | 10/2015 | Goldstein | |
| 2020/0011721 A1* | 1/2020 | Romer | G01F 15/005 |
| 2022/0042504 A1* | 2/2022 | Ward | F04B 49/04 |

* cited by examiner

WATER UTILITY METER WITH SMART RECONNECT FUNCTION

This application claims priority to European Patent Application No. 18181935.0 filed on Jul. 5, 2018, which is hereby incorporated herein by reference.

FIELD OF THE INVENTION

The invention relates to the field of smart utility meters with an integrated valve for disconnecting a consumption site from the distribution network and for water management.

BACKGROUND OF THE INVENTION

Water utilities wishes to control the delivery of water to the consumption sites connected to the utility distribution network. Consumption sites such as private residences, public buildings, private enterprises, farms etc. are connected to public water utilities through the utility distribution network. Water utility meters connects the consumption site to the utility distribution network and measures the volume of water delivered to the consumption site. Water utility meters are becoming increasingly advanced devices including remote communication, which enables the utility to remotely control the devices. Water utility meters includes communication interfaces such as proprietary advanced metering infrastructure (AMI) systems or public communication systems such as Narrow Band IOT devices introduced by the 5G cellular networks. The utility meters may include mechanisms for managing the water consumption such as valves for disconnecting the consumption site from the utility distribution network or valves with a throttling function limiting the volume of water delivered to the consumption site.

A consumption site may be disconnected from the utility distribution network for many reasons such as: non-payment of water bills; detection of an installation malfunction within the consumption site; to avoid consumption of contaminated water; scarcity of water etc.

Disconnecting consumption sites remotely through AMI systems by managing a valve located in relation to the water utility meter is commonly known and remote reconnection is also known. Some utilities have a prepayment business model and are thus depending on efficient and safe mechanisms for doing multiple connections/disconnections of the consumption sites e.g. remote reconnection through an AMI system.

However, reconnecting the consumption site includes a risk of massive water spill if the installation at the consumption site is not checked for malfunctions at the time of the reconnection. The spill may be caused by a tap left open or dismantled water installations. In the worst case the spilled water will not be let into the sewer, in that case an excessive water spill may cause severe damages to building parts and equipment in the buildings. To avoid water spills, and related damages for which the utility might be held liable, it has up until now been common practice to require an accept from the property owner, tenant or facility manager before reconnecting the consumption site. The acceptance by the property owner may be provided by the property owner pressing a button on the water utility meter/water management device releasing the valve for being reopened. This solution is however inconvenient to the general consumer. Especially elderly or disabled people may be put in an unacceptable situation, if the water utility meter is installed in a difficult accessible place such as a pit outside the building.

U.S. Pat. No. 9,900,667 B2 discloses a system and a method for remotely reconnecting a utility service meter, wherein an authorization message from the customer, confirming that conditions at the consumption site are safe for reconnection is required. The confirmation message is sent from an electronic device of the consumer to a utility server which in response sends a request to the utility meter to reconnect the consumption site.

The procedure of identifying, contacting and authorising the person entitled to approve a reconnection of the consumption site is however a cumbersome and difficult administrative burden to the utility companies.

Safe procedures for reconnecting consumption sites posing a very limited administrative burden to the utilities, limited risk of water spill and at the same time being convenient to the consumer may be provided by smart utility meters. A smart utility meter being able to automatically check the condition and state of a consumption site upon reconnection of the consumption site is proposed.

The smart utility meter may verify the condition of the consumption site and in case conditions not being suitable for a reconnection close the valve.

OBJECT OF THE INVENTION

An object of the present invention is to provide a smart utility meter that solves the above-mentioned disadvantages and drawbacks of the prior art.

In particular, it may be seen as a further object of the present invention to provide a smart utility meter, which is arranged to connect a consumption site to the utility distribution network and verify the state and condition of the consumption site to know if it is acceptable for reconnection. Yet another further object of the invention may be to limit water spill to a predictable and well-defined level minimizing the consequences of reconnecting a consumption site having a malfunctional installation.

SUMMARY OF THE INVENTION

Thus, the above described object and several other objects are intended to be obtained in a first aspect of the invention by providing a water utility meter arranged to register a volume of water delivered to a consumption site through a distribution network, the water utility meter comprising: a flow sensor arranged to measure a flow rate and/or a volume of water delivered to the consumption site; a valve for connecting and disconnecting the consumption site from the distribution network; an actuator for automatically opening and closing the valve; and a controller unit arranged to control the valve, the controller unit being configured for:—connect the consumption site to the distribution network by operating the actuator to open the valve; —analyse flow rate and/or volume measurements from the flow sensor to determine if a reference profile is violated; and—if the reference profile is violated disconnect the consumption site from the distribution network by closing the valve.

The water utility meter of the above embodiment provides a device for measuring water consumption and effectively managing the water delivered to the consumer. Analysing the flow rate and determining if the reference profile is violated has the purpose of determining if the installation at the consumption site is malfunctional. Controlling the valve in accordance to the state of the installation, prevents massive water spills in malfunctioning installations. The combined effect is that when a consumption site is reconnected to the distribution network a malfunctioning installation will not lead to a massive water spill. Limiting the water spill in case of a malfunctioning installation has the advantage that a consumption site may be reconnected to the distribution network with no prior check of the installation or consent from the property owner.

The registered volume of water may be used for billing purposes and the water utility meter may be a legal meter, i.e. a water utility meter which is subdued to regulatory demands. Such regulatory demands may be demands to the precision of the measurements.

The water utility meter comprises a flow sensor which may be based on any suitable flow measurement technology e.g. an ultra-sonic flow meter based on the transit time principle. The flow sensor may output a flow rate signal which can be integrated over a time period to provide a volume. Other flow sensors may output a volume signal comprising increments of consumed volume or an accumulated volume, such a signal may be differentiated to obtain a flow rate. Thus, a flow sensor arranged to measure a flow rate of water delivered to the consumption site may as well be construed as a flow sensor arranged to measure the volume of water delivered to the consumption site. And a flow sensor arranged to measure a volume of water delivered to the consumption site may as well be construed as a flow sensor arranged to measure the flow rate of water delivered to the consumption site.

The valve may be any kind of suitable valve such as a: ball valve; butterfly valve; needle valve, diaphragm valve; gate valve; plug valve or other mechanical valves. The position of the valve may be changed by use of an actuator to be in an open position, a closed position or a throttling position, where the throttling position may be any position in between the closed and open position.

Analysing the flow rate is to be construed as obtaining any data containing information about the flow rate. Analysing the changes of an accumulated volume register or registering pulses indicative of a consumed volume or volume flow does all when related to time include information about the flow rate. Analysing the flow rate may be a continuous or discontinuous function and may be based on time discrete samples. Analysing the flow rate may be performed in real time as measurement data are obtained and as such also be construed as monitoring the flow rate.

Analysing the flow rate to determine if a reference profile is violated may include processing the obtained data by any kind of well-known mathematic and statistical operations such as: integration; differentiation; calculation of delta values, accumulated values, maximum values, minimum values; statistical moments etc.

The reference profile defines a consumption profile which is not likely to be violated by a consumption site without malfunctioning installations. The reference profile may comprise flow limits, volume limits, time limits and conditions for violating the reference profile. Such conditions may define the order in—and/or time limits within—which certain limits shall or shall not be exceeded, to violate or confine to the reference profile. The reference profile may in its simplest form be a single limit such as flow rate limit or a volume limit. The reference profile does not need to be a single data structure of connected data elements, rather the reference profile may be constituted by one or more limits and conditions defined within the water utility meter. Thus, a water meter comprising one or more limits and/or conditions for evaluating a flow rate/a consumed volume is to be construed as a water meter comprising a reference profile.

A reference profile may comprise a maximum flow rate limit and a minimum flow rate limit and a condition defining that the reference profile is violated if the flow rate exceeds the maximum flow rate limit prior to the flow rate being below the minimum flow rate limit.

A consumption site without malfunctions may be characterized by a minimum flow rate which is approaching zero flow. The minimum flow rate may origin from small leaks at the consumption site. If the flow rate approaches the minimum flow rate the installation is safe for reconnection since no major water spills will occur. Defining a minimum flow rate limit above the minimum flow has the effect that the limit will not be exceeded by the flow generated from small leaks, such as a running water cistern, which are acceptable at the consumption site. A reference profile including a minimum flow rate limit is thus beneficial, and a flow rate below the minimum flow rate limit may be used as a condition for confining to the reference profile. The controller unit may cease to analyse the flow rate after a flow rate below the minimum flow rate limit has been observed.

The reference profile may further comprise a minimum flow rate limit and a maximum volume and the reference profile is violated if the volume delivered after reconnecting the consumption site exceeds the maximum volume prior to the flow rate being below the minimum flow rate limit.

Including a maximum volume that must not be exceeded before the flow rate is below the minimum flow rate has the effect that the total amount of spilled water may be limited to a well-defined maximum volume. This has the advantage that the potential damages caused by the water spill is limited.

Right after reconnecting a consumption site the water usage profile may be influenced by the previous shut off from the supply. This is due to reservoirs such as water tanks, boilers, water cisterns of water closets etc. need to be filled, which is causing an initial high flow. For that reason, an initial period of high flow rate may be expected. Thus, a water utility meter wherein the reference profile comprises a maximum flow rate limit which is divided into a first time period and one or more subsequent time periods, and where the maximum flow rate limit is different in the two or more time periods, may be beneficial.

Such a time divided maximum flow rate has the effect that water reservoirs may be filled initially causing a high flow rate for a limited period, without the reference profile is violated and the valve consequently is closed. Especially it may be optimal if the maximum flow rate limit is higher in the first time period than in any of the subsequent time periods.

Opening and closing the valve may not be an instant operation, rather there may be a transition time between an open and a closed position of several seconds or minutes, depending on the type of valve and actuator. Thus, it may be beneficial to arrange the controller unit to start analysing the flow rate after the valve has reached the intended position. The controller may start analysing the flow rate in respect of the different parameters at different times. As an example, the controller unit may start to calculate the volume from the time when a flow starts while the maximum flow rate and/or the minimum flow rate is calculated from the time when the valve is opened enough to allow a flow above the minimum flow rate limit or fully opened or at least close to fully opened. Further a reference profile comprising a minimum flow rate limit divided into a first time period and one or more subsequent time periods, where the minimum flow rate limit is zero in the first time period may be beneficial. This has the effect that a low flow in the transition period where the valve is not yet fully opened will not be interpreted as a flow rate below the minimum flow rate limit. The first time period may be selected to match the time for fully opening the valve or to opening the valve to a position wherein the valve is 10% to 90% open.

To compensate for the transition time of the valve or other initial conditions at the consumption site the controller unit may be arranged to analyse the flow rate to determine if a reference profile is violated from the point in time when the flow rate exceeds the minimum flow rate limit for the first time. This has the effect that an initial low flow due to the valve only being partly opened or external valves at the consumption site not being open is not interpreted as a flow below the minimum flow rate limit.

The reference profile may further contain a time limit and a condition defining that the reference profile is violated if the time limit is exceeded prior to the flow rate being below the minimum flow rate limit. After reconnecting the consumption site, it is expected that the flow rate will reach a level below the minimum flow rate limit within a given time if there are no malfunctional installations at the consumption site. The time limit may depend on the installation and the minimum flow rate.

Water utility meters may be installed at consumption sites having various consumption patterns thus it may be beneficial to use dynamic flow rate limits. A dynamic flow rate limit may be a maximum flow rate limit which is dynamic and is depending on a historical flow rate value measured by the water utility meter. Or alternatively a minimum flow rate limit which is dynamic and is depending on a historical flow rate value measured by the water utility meter. Dynamic flow rate limits has the effect that the meter adapts to the consumption pattern of the consumption site. Thus, a high minimum flow rate limit may be acceptable for an installation where the minimum flowrate historically has been known to be high. A dynamic maximum flow rate limit may be selected to be in the range of 50%-150% of a historic peak flow rate value. A dynamic minimum flow rate limit may be selected to be 50%-500% above a historic minimum flow rate value.

To minimize a potential water spill the controller unit may be arranged to only partly opening the valve until the flowrate becomes lower than the minimum flow rate limit. This has the effect of minimizing the water spill e.g. in the case of a dismantled installation at the consumption site.

The water utility meter may further comprise a communication interface and the water utility meter may be arranged to reconnect the consumption site to the utility distribution network in response to a communication received on the communication interface. The communication interface may be a wired interface or wireless interface based on RF communication, optical communication, near field communication or other wireless communication interfaces. The controller unit may further be arranged to remotely update the reference profile through a communication interface. Further the reference profile may be selected through the communication interface in a communication session in relation to remotely reconnecting the water utility meter.

The controller unit may be arranged to register the accumulated volume of water delivered to the consumption site and control the valve position. The controller unit may be a separate micro controller unit arranged to control the valve or be a function integrated in a microcontroller of the water utility meter. This may be in the form of a water utility meter wherein a single controller unit, such as a micro controller unit, is arranged to register the volume of delivered water and control the valve. Or a water utility meter wherein a single micro controller unit is arranged to register the volume of delivered water, control the valve and communicate with a communication partner using a communication interface of the meter. Or even a water utility meter wherein a single micro controller unit is arranged to control the flow sensor, register the volume of delivered water, control the valve and communicate with a communication partner using a communication interface of the meter.

The individual aspects of the present invention may each be combined with any of the other aspects. These and other aspects of the invention will be apparent from the following description with reference to the described embodiments.

BRIEF DESCRIPTION OF THE FIGURES

The water utility meter according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
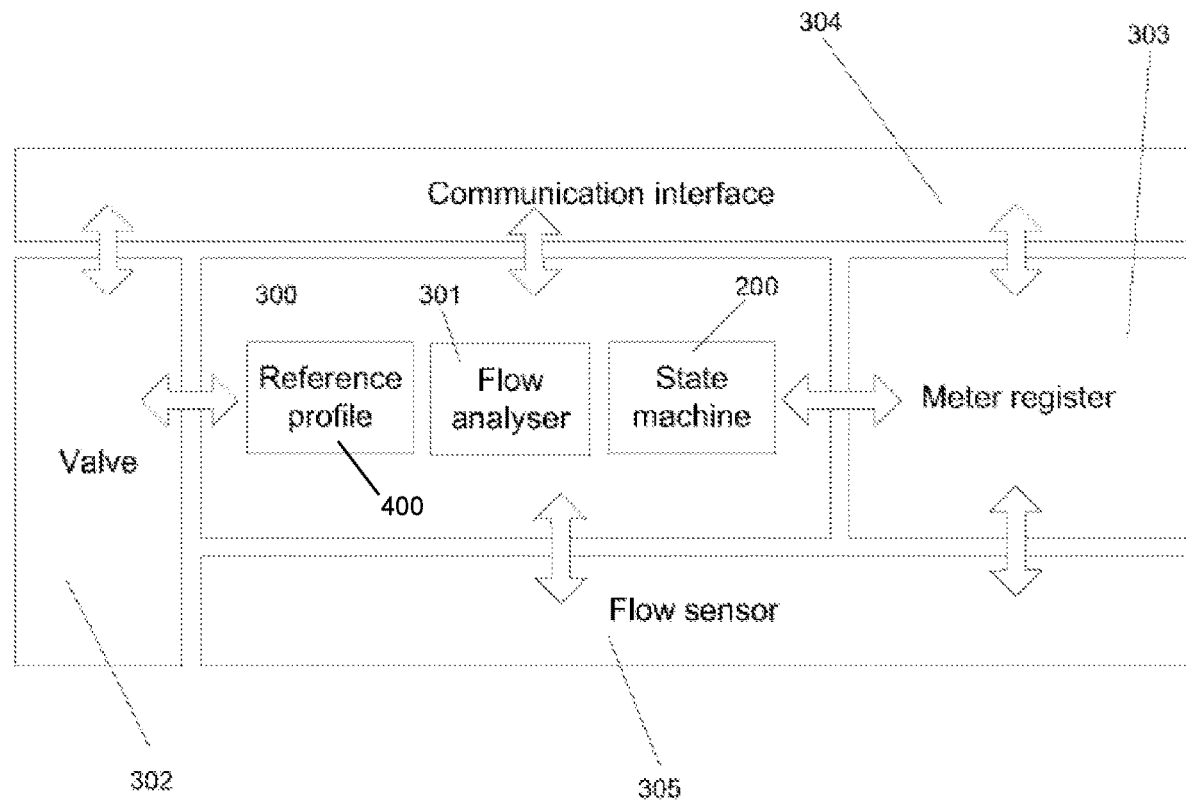
FIG. 1 shows the water utility meter in a schematic form comprising of functional units.

FIG. 1 shows a functional diagram of the water utility meter with a smart reconnection functionality. The water utility meter comprises multiple functional elements. The water utility meter is arranged to measure and analyse the flow of water into a consumption site in a period after opening the valve of the meter whereby the consumption site is connected to the utility distribution network. The measured flow is compared to a reference profile 400, comprising limits and conditions which are descriptive to a consumption site without malfunctional installations. If the reference profile is violated by the measured flow, the valve is automatically closed to prevent a massive water spill. On the contrary, if the measured flow confines to the profile and the appropriate conditions are met, analysing is stopped and the valve remains in the open state. The flow sensor 305 is arranged to measure the flow of water into the consumption site. The valve 302 arranged to connect or disconnect the consumption site to the utility distribution network. The meter register, 303 is arranged to register at least the volume of water delivered to the consumption site and may measure other parameters such as flow rates, peak flow, minimum flow, analyse the flow to detect leaks or burst in the installations at the consumption site. Further, the meter register may detect/register other events and parameters such as: tamper, sensor errors, dry meter, water temperature, ambient temperature etc. The communication interface 304 creates one or more wired or wireless communication interfaces suitable for communicating with external devices such as mobile or stationary meter reading devices. The controller unit 300 implements the smart reconnection functionality. The arrows on FIG. 1 indicates communication paths between the functional elements. Two functional elements, which are not directly connected may use an intermediate functional element as a communication channel for peer communication. The different functional elements may be implemented in HW or SW or a combination of both. The SW elements may be implemented in a common micro controller or in different micro controllers.

The controller unit 300 implements the smart reconnection functionality. Input to the controller unit comprises the reference profile 400 and flow data from the flow sensor 305. The controller unit 300 is implemented comprising two functional subunits: a state machine 200 and a flow analyser 301. The two functional subunits together determine if the flow violates or confines to the reference profile and control the valve accordingly. When the controller unit receives a request to connect the consumption site by opening the valve, the controller unit instructs the valve to open and the flow analyser and state machine is initiated.

Figure 2:
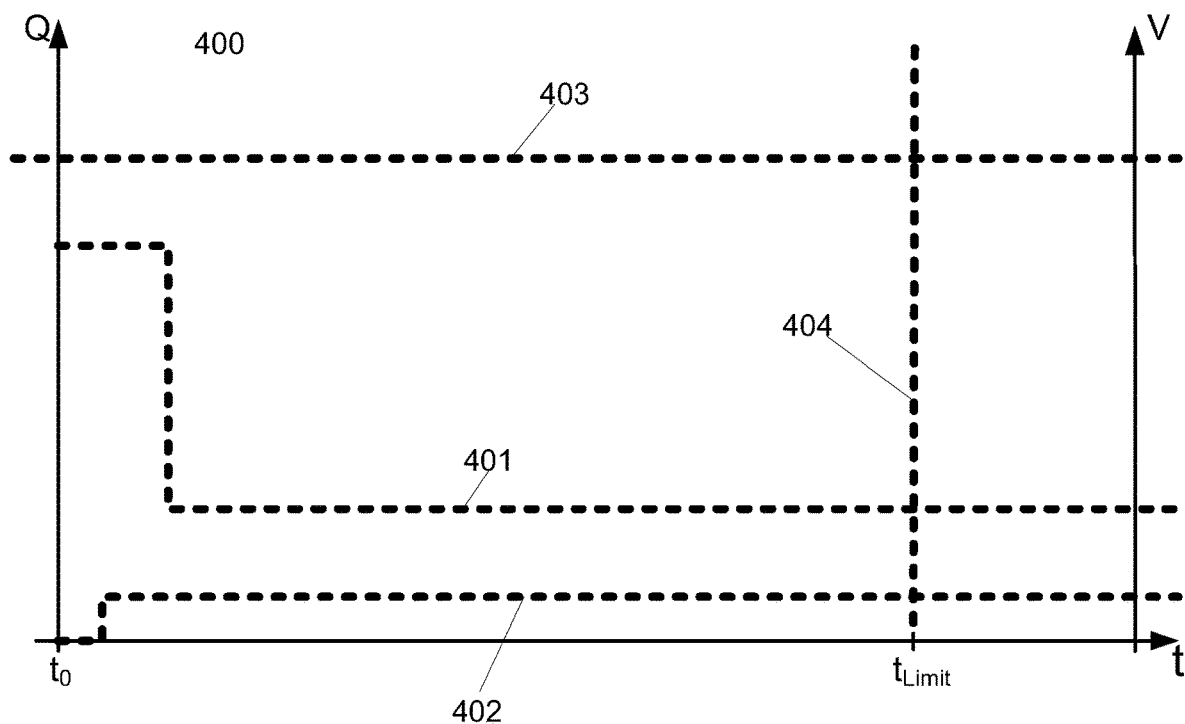
FIG. 2 illustrates the limits of a reference profile.

FIG. 2 depicts the limits of a reference profile in a schematically way. The time, t, is shown on the horizontal axis while the flow, Q, and accumulated volume, V, are shown on the two vertical axes. A maximum flow rate limit 401 and a minimum flow rate limit 402 are shown in FIG. 2. The flow rate limits are time depending and are compared to the actual flow rate at a given time. The maximum flow rate limit starts at an initial high level, which is higher than in any subsequent time period. The minimum flow rate is in an initial time period equal to zero flow, which compensates for the valve not being momentarily opened. A maximum time limit 404 is shown as a vertical line in FIG. 2. The maximum time limit is exceeded if the reference profile not has been confined to prior to the time $t_{Limit}$. A maximum volume limit 403 is shown as a horizontal line. The maximum flow rate limit is exceeded if the accumulated volume increases above the limit. The reference profile includes conditions for violating or confining to the reference profile. The flow data is to be tested against the reference profile over time. If a condition for violating the profile or confining to the profile is met, the test must be discontinued. The conditions for violating the profile are: maximum flow rate limit 401 exceeded; maximum time exceeded; and maximum volume exceeded. The condition for confining to the reference profile is a flow rate below the minimum flow rate limit 402.

External events may also be conditions for violating or confining to the reference profile. Such external events may be pressing a button on the water utility meter to either accept a connection of the consumption site or to indicate a malfunction at the consumption site. Other External events may come from pressure sensors or input on wired or wireless communication interfaces or general purpose digital or analogue input ports of the meter.

Figure 3:
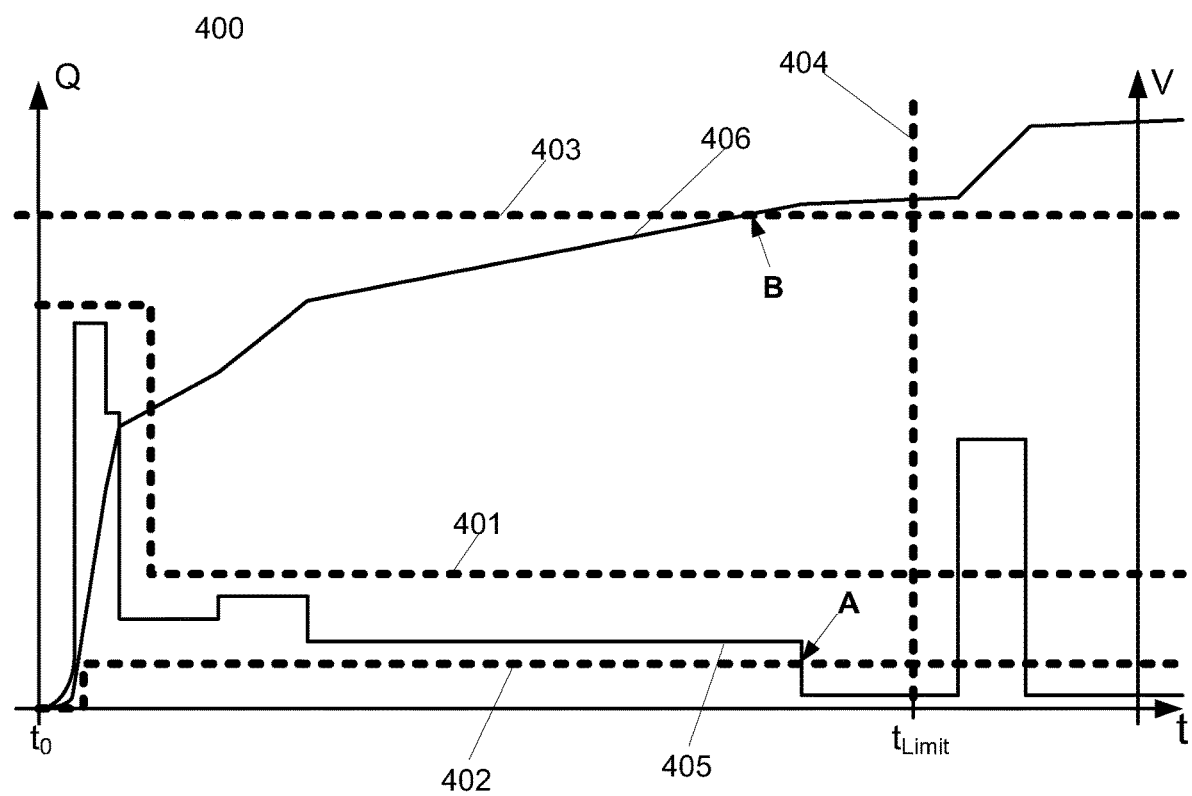
FIG. 3 illustrates a reference profile along with an example of a flow rate curve and an accumulated volume curve.

FIG. 3 depicts a reference profile including an example flow rate curve 405 and accumulated volume curve 406. First observing the flow rate curve, it is seen that the flow curve grows slowly at a start due to the valve having an opening time, where after the flowrate increases rapidly.

Following the curve does not cross any flow rate limits prior to point A where the flow rate decreases below the minimum flow rate limit. As a flow below the minimum flow rate limit is a condition for confining to the reference profile, the installation at the consumption site is accepted as ok, thus analysing the flow rate may cease and the valve may be left open. Next observing the accumulated volume curve 406, this curve shall be evaluated in relation to the maximum volume limit 403. At point B a condition for violating the reference profile is met, in that the accumulated volume increases above the maximum volume limit. At point B the valve shall be closed and analysing the flow rate may cease. Evaluating the flow data against the reference profile does however include observing flow rate as well as accumulated volume at the same time. This means that the consumption site generating the flow data on which the curves of FIG. 3 is based violates the reference profile and the water utility meter shall disconnect the consumption site by closing the valve.

The reference profile is implemented comprising a data structure in a volatile or non-volatile memory of the water utility meter. The reference profile may be updated through the communication interface.

Further the limits of the reference profile may be dynamic in that the controller unit may adjust the limits according measured historical flow values. The minimum flow rate limit may be adjusted according to a historical minimum flow value. In this way the minimum flow rate limit will be adjusted to compensate for leaks or continuous flows persisting in the installation. The minimum flow rate limit may be adjusted to a level in the range of 150%-500% of the measured minimum flow rate. If the minimum flow value is below the cut off flow, the flow rate limit the measured minimum flow rate is set to be equal to the cut off flow. The cut off flow is the minimum flow rate that the flow sensor or water meter is registering. In a similar way the maximum flow rate may be adjusted according to a historical peak flow rate limit to be in the range of 50%-150% of the measured minimum flow rate.

The flow analyser 301 in FIG. 1 receives flow data from the flow sensor processes the data to obtain metrics suitable for evaluating if the reference profile is violated. The flow analyser calculates: the flow rate, the accumulated volume; the maximum flow; the minimum flow and other metrics suitable for evaluating if the flow violates or confines to the reference profile. The flow analyser compares the metrics calculated based on the flow data to the reference profile and generates events when a limit of the reference profile is exceeded or not exceeded anymore. The generated events are fed into the state machine as input events which may trigger a state transition.

The metrics are calculated over different time periods, triggers for starting a calculation period are: start of flow; flow exceeds minimum flow rate limit; valve is open; valve is open more than a given level; time limit since first flow passed.

The flow analyser may be active or inactive independent on the actual state of the state machine 200. However, it may be beneficial to disable the flow analyser when the state machine is in specific states or upon entering or exiting specific states.

The flow analyser applies standard calculus functions including integration and differentiation to flow data received from the flow sensor. If flow data from the flow sensor are equidistant samples of the flow rate or accumulated volumes simple functions as addition and subtraction may be sufficient to generate the needed metrics. Other flow sensors may deliver a pulse for each consumed quantity which as well can be converted to a flow rate and accumulated volume applying well known methods.

Figure 4:
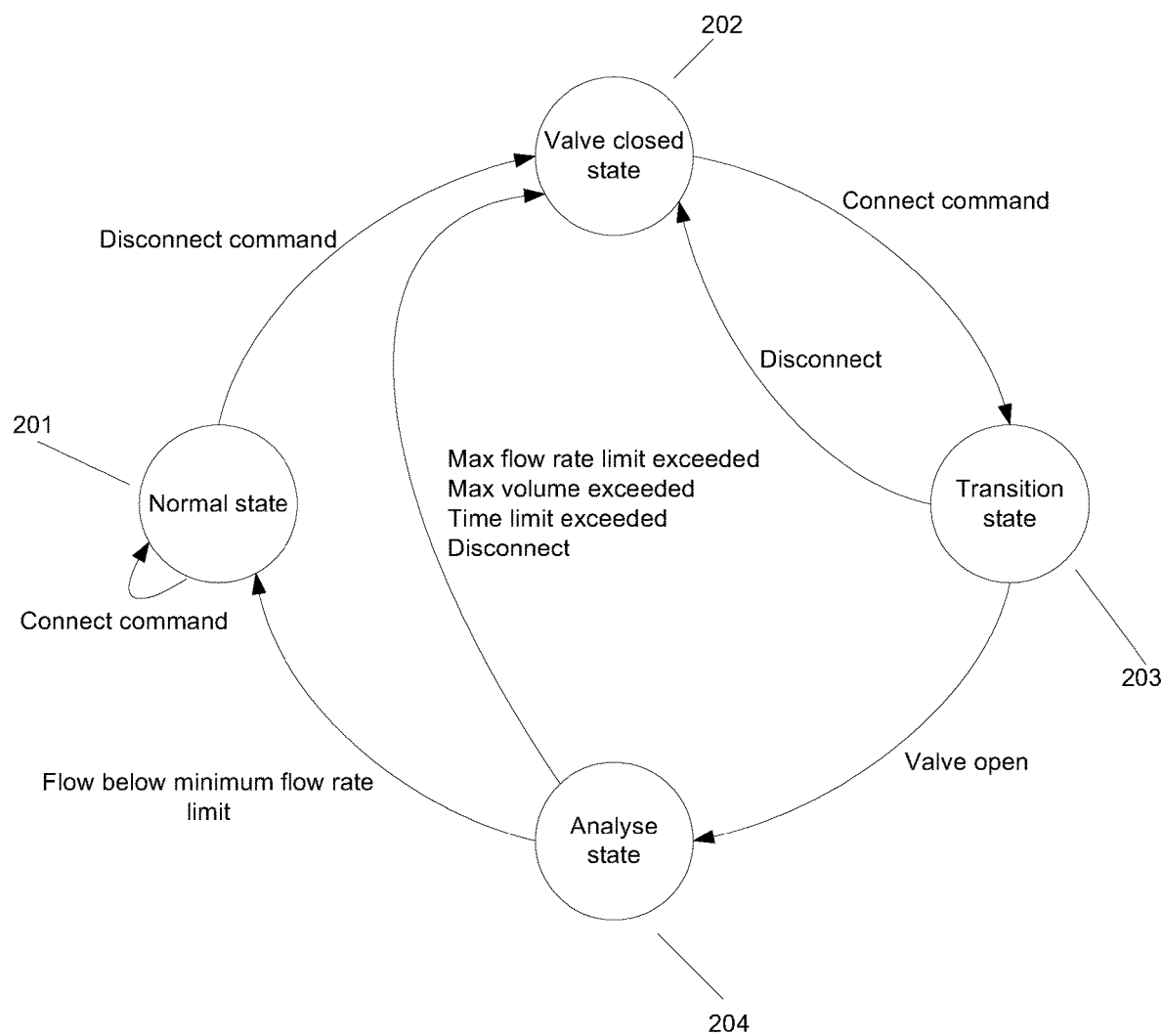
FIG. 4 shows a state machine for implementing the smart reconnect mechanism.

FIG. 4 shows an example of the state machine. The state machine comprises multiple states and transitions between the states, which are shown as arrows between the states. The state machine may comprise more states than shown in FIG. 4. A transition between states is caused by one or more specific events, the events causing a transition is shown at the arrow of the transition. The output from the data analyser is fed into the state machine as events, these events include but are not limited to events such as: max flow rate limit exceeded, flow below minimum flow rate limit, max volume exceeded, time limit exceeded. Multiple external inputs are fed into the state machine as events, these events include but are not limited to: connect command; disconnect command; and valve open. More events than shown on FIG. 4 may be used for implementing the state machine. In the normal state 201 the valve is open and the controller unit as such is inactive and the flow analyser may be disabled. When a disconnect event occurs e.g. as a consequence of a request received through the communication interface, a state transition will be initiated from normal state 201 to Valve closed state 202. If a Connect command is received a transition to the Transition state 203 will take place. The state machine will remain in this state while opening the valve i.e. until the valve open event occurs. The Valve open event may be configured to occur when the valve is fully opened or when the valve is opened to a defined level such as 10% open or 50% open. When the valve open event occurs a transition to analyse state 204 will take place. In the analyse state the control unit will analyse and monitor the flow to determine if it violates or confines to the reference profile. The reference profile comprises multiple conditions for violating the profile. If a condition for violating the profile is met a transition from analyse state to valve closed state is initiated. The reference profile also comprises conditions for confining to the reference profile i.e. to approve the reconnect. Flow below minimum flow rate limit is a condition for confining to the reference profile, if such a condition is met a transition to normal state 201 will take place.

It is to be understood by the skilled person that the state machine may include further elements than those illustrated in FIG. 4. Any of the states may have one or more actions to be performed when entering or exiting the state associated with them. The action may depend on the event triggering the transition. As an example, when a transition from analyse state to valve closed state occur due to a maximum volume exceeded event an action performed is to close the valve. These actions are not shown in FIG. 1. The state machine may include further states or intermediate states or decisions between states which are also not included in FIG. 4.

The state machine may be realized as a SW function in a micro controller or as a HW realization e.g. in a FPGA.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A water utility meter arranged to register a volume of water delivered to a consumption site through a distribution network, the water utility meter comprising:
 a flow sensor arranged to measure a flow rate and/or a volume of water delivered to the consumption site;
 a valve for connecting and disconnecting the consumption site from the distribution network;
 an actuator for opening and closing the valve; and
 a controller arranged to control the actuator, the controller further being configured to:
  connect the consumption site to the distribution network by operating the actuator to open the valve,
  analyze flow rate and/or volume measurements from the flow sensor to determine if a reference profile is violated, and
  if the reference profile is violated disconnect the consumption site from the distribution network by closing the valve;
 wherein the reference profile is violated if, prior to the flow rate being below a minimum flow rate limit, at least one of the following occurs:
  the flow rate exceeds a maximum flow rate limit,
  a volume delivered after reconnecting the consumption site exceeds a maximum volume, or
  a time limit is exceeded.

2. A water utility meter according to claim 1, wherein the water utility meter further comprises a communication interface and the water utility meter is arranged to reconnect the consumption site to the utility distribution network in response to a communication received on the communication interface.

3. A water utility meter according to claim 2, wherein the controller is arranged to remotely update the reference profile through the communication interface.

4. A water utility meter according to claim 2 wherein the reference profile is selected through the communication interface in a communication session in relation to remotely reconnecting the water utility meter.

5. A water utility meter according to claim 1, wherein the reference profile is violated if the flow rate exceeds the maximum flow rate limit prior to the flow rate being below the minimum flow rate limit.

6. A water utility meter according to claim 1, wherein the reference profile is violated if the volume delivered after reconnecting the consumption site exceeds the maximum volume prior to the flow rate being below the minimum flow rate limit.

7. A water utility meter according to claim 1, wherein the maximum flow rate limit is divided into a first time period and one or more subsequent time periods, and wherein the maximum flow rate limit is different in the two or more time periods.

8. A water utility meter according to claim 7, wherein the maximum flow rate limit is higher in the first time period than in any of the subsequent time periods.

9. A water utility meter according to claim 1, wherein the minimum flow rate limit is divided into a first time period and one or more subsequent time periods, and wherein the minimum flow rate limit is zero in the first time period.

10. A water utility meter according to claim 1 wherein the reference profile is violated if the time limit is exceeded prior to the flow rate being below the minimum flow rate limit.

11. A water utility meter according to claim 1 wherein the maximum flow rate limit is dynamic and depends on a historical flow rate value measured by the water utility meter.

12. A water utility meter according to claim 1 wherein the minimum flow rate limit is dynamic and depends on a historical flow rate value measured by the water utility meter.

13. A water utility meter according claim 1, wherein the controller is arranged to only partly open the valve until the flowrate becomes lower than the minimum flow rate limit.

14. A water utility meter according to claim 1, wherein the controller is further configured to registers the accumulated volume of water delivered to the consumption site and controls the valve position.

15. A water utility meter according to claim 1 wherein the controller is further configured to analyze the flow rate to determine if a reference profile is violated starting from the point in time when the flow rate exceeds the minimum flow rate limit for the first time.

16. A water utility meter according to claim 1 wherein the reference profile is violated if:
   the flow rate exceeds the maximum flow rate limit prior to the flow rate being below the minimum flow rate limit, and
   the volume delivered after reconnecting the consumption site exceeds the maximum volume prior to the flow rate being below the minimum flow rate limit.

17. A water utility meter arranged to register a volume of water delivered to a consumption site through a distribution network, the water utility meter comprising:
   a flow sensor arranged to measure a flow rate and/or a volume of water delivered to the consumption site;
   a valve for connecting and disconnecting the consumption site from the distribution network;
   an actuator for opening and closing the valve; and
   a controller arranged to control the actuator, the controller further being configured to:
      connect the consumption site to the distribution network by operating the actuator to open the valve,
      analyze flow rate and/or volume measurements from the flow sensor to determine if a reference profile is violated, and
      if the reference profile is violated disconnect the consumption site from the distribution network by closing the valve;
   wherein the reference profile comprises a minimum flow rate limit divided into a first time period and one or more subsequent time periods, and
   wherein the minimum flow rate limit is zero in the first time period.

18. A water utility meter according to claim 17 wherein the controller is arranged to only partly open the valve until the flowrate becomes lower than the minimum flow rate limit.

19. A water utility meter arranged to register a volume of water delivered to a consumption site through a distribution network, the water utility meter comprising:
   a flow sensor arranged to measure a flow rate and/or a volume of water delivered to the consumption site;
   a valve for connecting and disconnecting the consumption site from the distribution network;
   an actuator for opening and closing the valve;
   a controller arranged to control the actuator, the controller further being configured to:
      connect the consumption site to the distribution network by operating the actuator to only partially open the valve until the flowrate becomes lower than a minimum flow rate limit,
      analyze flow rate and/or volume measurements from the flow sensor to determine if a reference profile is violated, and
      if the reference profile is violated disconnect the consumption site from the distribution network by closing the valve.

20. A water utility meter according to claim 19 wherein A water utility meter according to claim 1 wherein the reference profile is violated if a time limit is exceeded prior to the flow rate being below the minimum flow rate limit.

* * * * *